Dec. 11, 1928.
D. M. SOLENBERGER
EXPANDER FOR SEALING RINGS
Filed Dec. 31, 1925
1,694,566
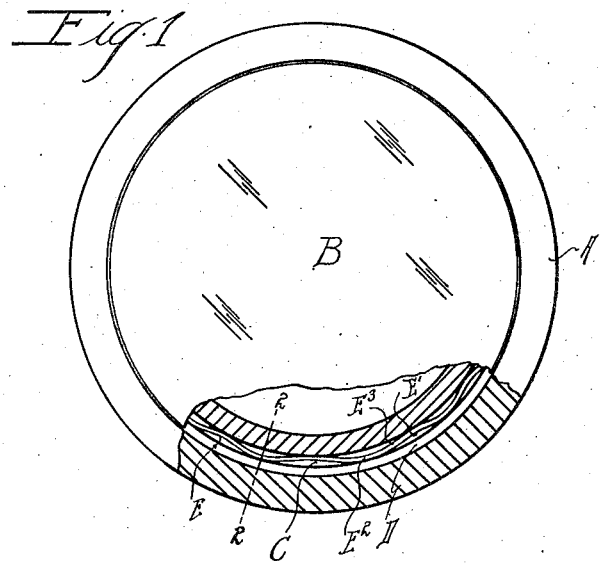
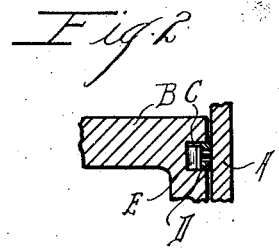
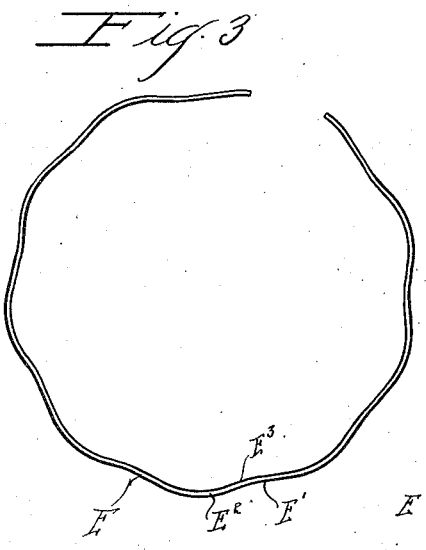
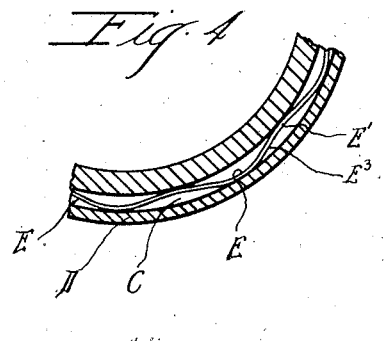
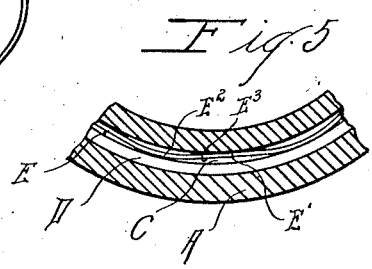
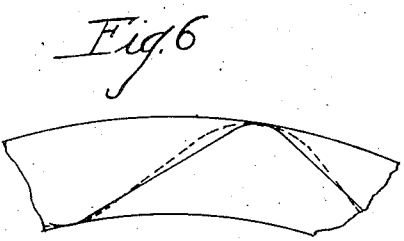
Inventor
Dean M. Solenberger
By Whittemore Hulbert Whittemore
& Belknap
Attorneys Patented Dec. 11, 1928.

1,694,566

UNITED STATES PATENT OFFICE.

DEAN M. SOLENBERGER, OF CLEVELAND, OHIO, ASSIGNOR TO SIMPLEX PISTON RING COMPANY, OF CLEVELAND, OHIO, A CORPORATION OF OHIO.

EXPANDER FOR SEALING RINGS.

Application filed December 31, 1925. Serial No. 78,678.

The invention relates to sealing rings such as are used for the sealing of pistons in internal combustion engines and other structures subjected to relatively-high temperatures.

It is the object of the invention to provide a means for conforming the ring to the surface of the cylinder in all portions of the piston travel and even where the cylinder is distorted or of varying diameter in different portions.

It is a further object to eliminate piston slap such as occasioned by the angularity of the connecting rod and where the piston does not closely fit the cylinder.

Still further it is an object to obtain a construction which will maintain its efficiency after long service or where subjected to abnormally high temperatures.

With these objects in view the invention consists in the peculiar construction of resilient expander through which a distributed radial pressure is applied to the piston ring as hereinafter set forth.

In the drawings;

Figure 1 is a horizontal section through a piston and cylinder.

Figure 2 is a section on line 2—2 of Figure 1.

Figure 3 is a plan view of the expander detached.

Figure 4 is a horizontal section through the piston and ring showing the expander in fully expanded condition.

Figure 5 is a similar view showing the piston and ring in engagement with the cylinder and the expander under tension.

Figure 6 is a diagram illustrating the modification in form of the expander to vary the tension thereof.

A is a cylinder; B a piston having one or more grooves C therein for receiving the sealing rings D. These rings are preferably limited in radial thickness so as to be extremely flexible and consequently have insufficient tension in themselves to maintain proper peripheral sealing contact. This is particularly true, if as shown, the rings are circumferentially slotted and are compressed to exert a resilient tension upon the side walls of the groove. It is therefore necessary to apply additional radial pressure which is accomplished by an expander of the following construction; E is a ribbon preferably formed of steel and of a width which will loosely fit within the ring groove. This ribbon is bent or corrugated to form a plurality of distributed contacts with the inner face of the ring D and intermediate contacts with the bottom face of the ring groove. All of these bends are of a predetermined selected radius and the reverse curves are connected by straight line portions tangent thereto. Thus, variations in the tension of the expander may be obtained either by changing the radius of the bends or by increasing or diminishing the number of corrugations. By such variations any desired radial pressure may be applied to the ring within the ring groove to produce the desired pressure of the ring against the cylinder. Also with this form of construction practically all of the metal of the ribbon is at work and localized stresses which might weaken the expander or cause a permanent set thereof are avoided.

As is well understood, the elastic limit of the metal is determined by the heat treatment, being greatest where the temper is drawn to the least extent. Inasmuch however, as the expander is subjected to the internal heat of the engine, any temper which is drawn less than the temperature to which the ribbon may be subsequently subjected, will not be permanent. Therefore, an expander which would properly function when first installed, might later prove ineffectual due to the drawing of the temper thereof. I have avoided this difficulty by drawing the temper of the ribbon of which the expander is formed, by a temperature in excess of the maximum temperature to which it may subsequently be subjected in the engine. This limits the permissible degree of deflection but by varying the distance between successive contacting bearings and by placing all or the greater part of the metal at work, the proper degree of expansion may be obtained within the elastic limit. Also by using the expander in combination with rings abnormally thin radially, sufficient clearance is provided in a ring groove which is designed for receiving a single piece ring.

Figures 4 and 5 show the expander respectively in fully expanded position and in compressed position. In the former, the reverse curves $E'$ and $E^2$ are of their natural radius and are connected by a straight portion $E^3$ tangent thereto.

In Figure 5 the curves $E'$ and $E^2$ have been flattened out to some extent against the contacting faces of the ring and ring groove but still connected by the straight line portion $E^3$. Thus, every portion of the ribbon is in work and the tension is determined not only by the cross section of the ribbon but by the radius of the curves. Thus, as shown in Figure 6 a change from the small radius curves shown in full lines to the large radius curves shown in dotted lines will decrease the tension of the expander and therefore any desired tension may be obtained by the selection of a proper radius. The tension may also be varied by increasing or decreasing the number of corrugations in the ring.

The construction of expander above described is useful not only in maintaining contact of the ring with the cylinder but in resisting piston slap against the cylinder walls. The tension required for these combined functions may be determined and the requisite variation produced for different constructions by varying the number of corrugations in the circle of the ribbon.

What I claim as my invention is:

1. An expander for a sealing ring comprising a resilient ribbon corrugated to form a series of reverse curves and intermediate portions tangent thereto, the radii of said curves being selected to produce in the operation of the expander a predetermined radial pressure.

2. An expander for a sealing ring comprising a resilient ribbon corrugated to form a series of spaced reverse curves having radii selected to produce in the operation of the expander a predetermined radial pressure, and intermediate portions tangent to said curves inversely variable to the radii thereof to maintain a substantially constant spacing between centers of curves.

3. An expander for a sealing ring in an internal combustion engine comprising a corrugated tempered steel ribbon having its temper drawn by a temperature in excess to a maximum temperature to which said expander is subjected in the engine, said corrugations forming in series of reverse curves of selected radii and intermediate portions tangent to said curves inversely variable to the radii thereof to maintain a substantially constant spacing between centers of curves.

In testimony whereof I affix my signature.

DEAN M. SOLENBERGER.